(12) United States Patent
Ohtaki et al.

(10) Patent No.: US 10,191,465 B2
(45) Date of Patent: Jan. 29, 2019

(54) MONITORING AND CONTROL SYSTEM AND MONITORING AND CONTROL METHOD

(71) Applicant: KABUSHIKI KAISHA TOSHIBA, Minato-ku (JP)

(72) Inventors: Yuki Ohtaki, Fuchu (JP); Kazuya Shiosaki, Kunitachi (JP); Hiroyuki Kubota, Kunitachi (JP); Nobuyuki Takahashi, Higashiyamato (JP); Yoji Kubo, Fuchu (JP); Jin Murata, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 304 days.

(21) Appl. No.: 15/333,388

(22) Filed: Oct. 25, 2016

(65) Prior Publication Data

US 2017/0123398 A1    May 4, 2017

(30) Foreign Application Priority Data

Oct. 29, 2015    (JP) ................................ 2015-213193

(51) Int. Cl.
| | | |
|---|---|---|
| *G05B 19/048* | (2006.01) | |
| *H04L 29/08* | (2006.01) | |
| *H04L 29/06* | (2006.01) | |

(52) U.S. Cl.
CPC ............ *G05B 19/048* (2013.01); *H04L 63/20* (2013.01); *H04L 67/125* (2013.01); *G05B 2219/24015* (2013.01)

(58) Field of Classification Search
CPC ..... G05B 19/048; H04L 67/125; H04L 63/20; H02J 13/0086
See application file for complete search history.

(56) References Cited

U.S. PATENT DOCUMENTS

| | | | | |
|---|---|---|---|---|
| 9,191,368 | B2 | 11/2015 | Atamna | |
| 2011/0075825 | A1* | 3/2011 | Balasaygun | ........ G06F 9/45533 379/93.17 |

(Continued)

FOREIGN PATENT DOCUMENTS

| | | |
|---|---|---|
| CN | 103491072 A | 1/2014 |
| CN | 104618341 A | 5/2015 |
| CN | 104639910 A | 5/2015 |

*Primary Examiner* — Changhyun Yi
(74) *Attorney, Agent, or Firm* — Oblon, McClelland, Maier & Neustadt, L.L.P.

(57) ABSTRACT

A monitoring and control system includes a monitoring and control apparatus that transmits an instruction signal for instructing to control a target device to transmission destinations on a first and a second network by a transmission method that designates a plurality of transmission destinations and does not require responses from the transmission destinations, a controller that controls the target device according to the instruction signal and transmits process data indicating a process of the control to transmission destinations on the first and second networks by the transmission method, a transmitter that transmits the instruction signal and the process data to transmission destinations on the second network, a receiver that receives and transfers the instruction signal and the process data addressed to the transmission destinations on the second network and transmitted from the transmitter, and a monitor that receives the instruction signal and the process data.

10 Claims, 13 Drawing Sheets

(56) References Cited

U.S. PATENT DOCUMENTS

| | | | |
|---|---|---|---|
| 2013/0179593 A1* | 7/2013 | Dunlap | H04L 45/42 709/244 |
| 2014/0247941 A1* | 9/2014 | Gu | H04L 63/062 380/270 |
| 2014/0267094 A1* | 9/2014 | Hwang | G06F 3/0488 345/173 |
| 2014/0281478 A1* | 9/2014 | Huang | H04W 4/50 713/150 |
| 2015/0181398 A1* | 6/2015 | Garbin | H04W 4/16 455/417 |
| 2017/0063968 A1* | 3/2017 | Kitchen | H04L 67/10 |

* cited by examiner

400

| TRANSMISSION DESTINATION ADDRESS | TRANSMISSION SOURCE ADDRESS | ETHERNET DATA |

FIG.12A

| TRANSMISSION DESTINATION ADDRESS | TRANSMISSION SOURCE ADDRESS | VLAN INFORMATION #1 | ETHERNET DATA |

FIG.12B

| TRANSMISSION DESTINATION ADDRESS | TRANSMISSION SOURCE ADDRESS | VLAN INFORMATION #2 | ETHERNET DATA |

FIG.12C

| VLAN MODULE | VLAN INFORMATION |
|---|---|
| FIRST VLAN MODULE 512A | VLAN INFORMATION #1 |
| FIRST VLAN MODULE 512B | VLAN INFORMATION #2 |

FIG.13A

| VLAN INFORMATION | TRANSMISSION INTERFACE |
|---|---|
| VLAN INFORMATION #1 | SECOND ETHERNET SUBSTRATE 621A |
| VLAN INFORMATION #2 | SECOND ETHERNET SUBSTRATE 621B |

FIG.13B

MONITORING AND CONTROL SYSTEM AND MONITORING AND CONTROL METHOD

CROSS REFERENCE TO RELATED APPLICATIONS

This application is based upon and claims the benefit of priority from the prior Japanese Patent Application No. 2015-213193, filed on Oct. 29, 2015, the entire contents of which are incorporated herein by reference.

FIELD

The embodiments of the present invention relate to a monitoring and control system and a monitoring and control method.

BACKGROUND

A monitoring and control system that monitors and controls a target device in a facility such as a power station is conventionally established using a local network. Therefore, security is not regarded as important in the conventional monitoring and control system. However, demands to connect a monitoring and control system to an external network such as the Internet have been increasing in recent years. For example, transmitting process data that indicates a process of control of a target device from a monitoring and control system to a terminal on an external network to use the process data or monitoring a target device from a remote location using a terminal on an external network is demanded.

When a monitoring and control system is connected to an external network, protection of the monitoring and control system against an attack from the external network is needed. A firewall is known as an example of a method of protecting a monitoring and control system. The firewall can theoretically protect the monitoring and control system from an external attack; however, it cannot be asserted that the monitoring and control system is always safe.

Another method of protecting a monitoring and control system other than the firewall is a method that allows communication only in one direction from the monitoring and control system to an external network using a TCP (Transmission Control Protocol)/IP (Internet Protocol). In unidirectional communication using the TCP/IP, process data acquired in the monitoring and control system can be monitored by a terminal on an external network while the monitoring and control system is protected. However, when the process data is to be transmitted from the monitoring and control system to the terminal on the external network, a response from the terminal on the external network is required. Therefore, there is a problem that the process data cannot be transmitted promptly to the terminal on the external network.

BRIEF DESCRIPTION OF THE DRAWINGS

FIG. 12A is a schematic diagram showing an Ethernet® frame before attachment of VLAN information in an operation example of a transmitter in the monitoring and control system according to the fifth embodiment, FIG. 12B is a schematic diagram showing the Ethernet frame after attachment of VLAN information of a first segment, and FIG. 12C is a schematic diagram showing the Ethernet frame after attachment of VLAN information of a second segment;

FIG. 13A shows a correspondence relation between first VLAN modules of a transmitter and VLAN information to be attached by the first VLAN modules, in an operation example of the transmitter in the monitoring and control system according to the fifth embodiment, and FIG. 13B shows a correspondence relation between VLAN information and second Ethernet substrates of a receiver linked to the VLAN information in an operation example of the receiver;

DETAILED DESCRIPTION

Figure 1:
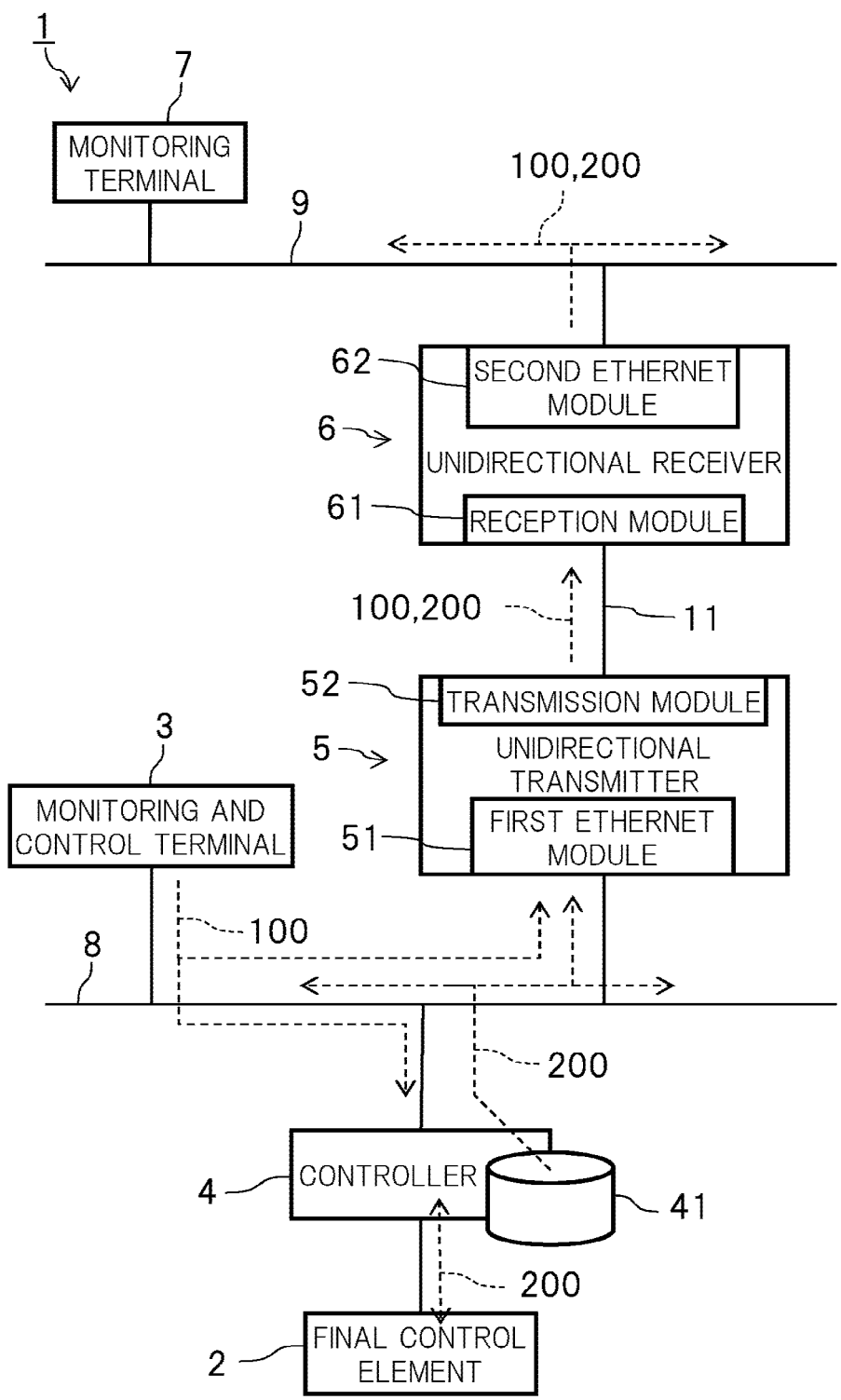
FIG. 1 is a block diagram showing a monitoring and control system according to a first embodiment.

A monitoring and control system according to an embodiment includes a monitoring and control apparatus located on a first network and transmits an instruction signal for instructing to control a target device to transmission destinations on the first network and a second network by a transmission method designating a plurality of transmission destinations and not requiring responses from the transmission destinations, a controller being one of the transmission destinations on the first network, controlling the target device according to the instruction signal, and transmitting process data indicating a process of the control to transmission destinations on the first and second networks by the transmission method, a transmitter located on the first network, being capable of communication in a direction from the first network to a third network connecting the first network and the second network to each other, and transmitting the instruction signal from the monitoring and control apparatus and the process data from the controller to transmission destinations on the second network, a receiver located on the second network, being capable of communication in a direction from the third network to the second network, and receiving and transferring the instruction signal and the process data addressed to the transmission destinations on the second network and transmitted from the transmitter, and a monitor being one of the transmission destinations on the second network and receiving the instruction signal and the process data transferred from the receiver.

A monitoring and control method according to an embodiment includes transmitting, using a monitoring and control apparatus located on a first network, an instruction signal for instructing to control a target device to transmission destinations on the first network and a second network by a transmission method designating a plurality of transmission destinations and not requiring responses from the transmission destinations, controlling the target device according to the instruction signal and transmitting process data indicating a process of the control to transmission destinations on the first and second networks by the transmission method, using a controller being one of the transmission destinations on the first network, transmitting the instruction signal from the monitoring and control apparatus and the process data from the controller to transmission destinations on the second network using a transmitter located on the first network and capable of communication in a direction from the first network to a third network connecting the first network and the second network to each other, receiving and transferring the instruction signal and the process data addressed to the transmission destinations on the second network and transmitted from the transmitter using a receiver located on the second network and being capable of communication in a direction from the third network to the second network, and receiving the instruction signal and the process data transferred from the receiver using a monitor being one of the transmission destinations on the second network.

According to the present invention, safety in control of a target device on a network and promptness of monitoring can be both provided.

Embodiments will now be explained with reference to the accompanying drawings. The present invention is not limited to the embodiments.

First Embodiment

FIG. 1 is a block diagram showing a monitoring and control system 1 according to a first embodiment. The monitoring and control system 1 according to the first embodiment can be used to monitor and control a target device in a power station, for example.

As shown in FIG. 1, the monitoring and control system 1 includes a final control element 2 as an example of a target device, a monitoring and control terminal 3 as an example of a monitoring and control apparatus, a controller 4, a unidirectional transmitter 5 as an example of a transmitter, a unidirectional receiver 6 as an example of a receiver, and a monitoring terminal 7 as an example of a monitor. The controller 4 includes a process database 41. The unidirectional transmitter 5 includes a first Ethernet module 51 and a transmission module 52. The unidirectional receiver 6 includes a reception module 61 and a second Ethernet module 62. A plurality of the final control elements 2 can be placed.

(Monitoring and Control Terminal 3)

The monitoring and control terminal 3 is, for example, a personal computer. The monitoring and control terminal 3 is placed on, that is, connected to a control network 8 being an example of a first network. The monitoring and control terminal 3 transmits an instruction signal 100 for instructing to control the final control element 2 to a transmission destination on the control network 8 and a transmission destination on a remote network 9 being an example of a second network. Specifically, the monitoring and control terminal 3 transmits the instruction signal 100 addressed to the controller 4 on the control network 8 and the monitoring terminal 7 on the remote network 9 by UDP (User Datagram Protocol) multicast or broadcast. The UDP multicast and the broadcast are examples of a transmission method that designates a plurality of transmission destinations and that does not require responses from the transmission destinations. More specifically, the monitoring and control terminal 3 transmits the instruction signal 100 in an Ethernet frame format.

The final control element 2 is, for example, a device that controls a power generation process in a power station upon reception of a signal from the controller 4. The final control element 2 can be, for example, a switching device that opens and closes a valve of a pump provided in the power station. The control network 8 is Ethernet (LAN (Local Area Network)) that can be used for monitoring and control of the final control element 2. The remote network 9 is Ethernet that can be used for monitoring of the final control element 2 from a remote location. Communication from the remote network 9 to the control network 8 is impossible. Accordingly, the remote network 9 cannot be used for control of the final control element 2.

Among the transmission destinations of the instruction signal 100, the controller 4 placed on the control network 8 is an instruction target of the instruction signal 100. For other transmission destinations (the monitoring terminal 7, for example) than the controller 4, the instruction signal 100 signifies a monitoring target.

Other devices than the monitoring and control terminal 3 and the controller 4 illustrated in FIG. 1 can also be placed on the control network 8. For example, a server that collectively manages data (monitoring screen data, for example) to be handled by the monitoring and control terminal 3 or a plurality of the monitoring and control terminals 3 can be connected to the control network 8. Other devices than the monitoring terminal 7 illustrated in FIG. 1 can be placed on the remote network 9. For example, a plurality of the monitoring terminals 7 can be connected to the remote network 9.

Use of the UDP multicast or the broadcast enables the monitoring and control terminal 3 to promptly transmit the instruction signal 100 to the transmission destinations without requiring responses from the transmission destinations of the instruction signal 100.

(Controller 4)

The controller 4 is placed on the control network 8. The controller 4 controls the final control element 2 according to logic of the controller 4 in response to the instruction signal 100 from the monitoring and control terminal 3. The logic of the controller 4 is, for example, logic on software implemented by an algorithm.

The controller 4 controls the final control element 2 considering operation states of final control elements other than the final control element 2 that is instructed by the instruction signal 100. For example, in a case where the instruction signal 100 is for instructing a valve switching device to execute valve opening control, the controller 4 does not instruct the valve switching device to open a valve when final control elements other than the valve switching device indicate a state in which the valve is not to be opened.

The controller 4 retains process data 200 in the process database 41 during control of the final control element 2. The process data 200 is information indicating a process of control of the final control element 2 according to the instruction signal 100. The process data 200 can include, for example, at least one of the instruction signal 100, an operation command to the final control element 2 according to the instruction signal 100, and information responded by the final control element 2 to the instruction signal 100.

The controller 4 transmits the process data 200 to a transmission destination on the control network 8 and a transmission destination on the remote network 9 by the UDP multicast or the broadcast. Specifically, the controller 4 transmits the process data 200 to the monitoring and control terminal 3 on the control network 8 and the monitoring terminal 7 on the remote network 9. More specifically, the controller 4 transmits the process data 200 in an Ethernet frame format.

Use of the UDP multicast or the broadcast enables the controller 4 to promptly transmit the process data 200 to the transmission destinations without requiring responses from the transmission destinations.

(Unidirectional Transmitter 5)

The unidirectional transmitter 5 is placed on the control network 8. The unidirectional transmitter 5 is connected between the control network 8 and one of ends of a unidirectional network 11 as an example of a third network. The unidirectional transmitter 5 is capable of communication in a direction from the control network 8 to the unidirectional network 11. On the other hand, the unidirectional transmitter 5 is incapable of communication in a direction from the unidirectional network 11 to the control network 8. The unidirectional network 11 is, for example, an optical cable.

Figure 2A:
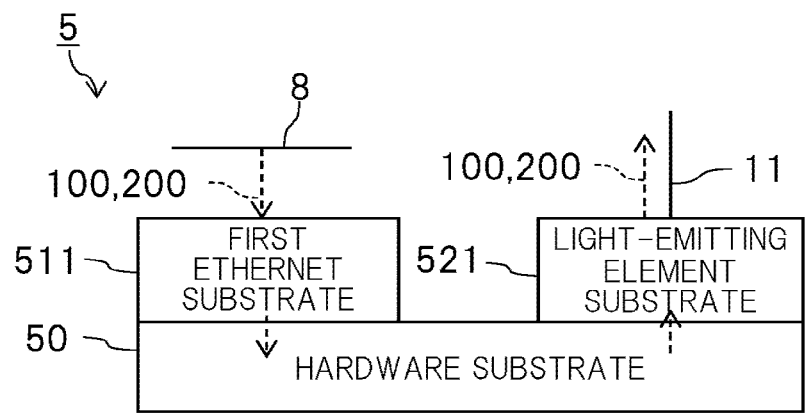
FIG. 2A is a schematic sectional view showing a transmitter in the monitoring and control system according to the first embodiment.

FIG. 2A is a schematic sectional view showing the unidirectional transmitter 5 in the monitoring and control system 1 according to the first embodiment. As shown in FIG. 2A, the unidirectional transmitter 5 includes a hardware substrate 50, and a first Ethernet substrate 511 and a light-emitting element substrate 521 which are placed on the hardware substrate 50. The hardware substrate 50 is, for example, a mother board and includes a memory, a CPU (Central Processing Unit), and the like (not shown). The first Ethernet substrate 511 constitutes the first Ethernet module 51. The light-emitting element substrate 521 constitutes the transmission module 52.

The first Ethernet substrate 511 receives the instruction signal 100 and the process data 200 addressed to the monitoring terminal 7. The CPU of the hardware substrate 50 copies the instruction signal 100 and the process data 200 received by the first Ethernet substrate 511 into the memory. The light-emitting element substrate 521 transmits the instruction signal 100 and the process data 200 copied into the memory as an optical signal to the unidirectional network 11. The light-emitting element substrate 521 does not have a function to receive data from the unidirectional network 11. Accordingly, communication in a direction from the unidirectional network 11 to the control network 8 can be prevented.

By performing unidirectional communication from the control network 8 to the unidirectional network 11, the unidirectional transmitter 5 can transmit the instruction signal 100 and the process data 200 required for monitoring of the final control element 2 to the monitoring terminal 7 on the remote network 9. Furthermore, the unidirectional transmitter 5 can prevent an intrusion, that is, an unauthorized access from the remote network 9 to the control network 8.

(Unidirectional Receiver 6)

As shown in FIG. 1, the unidirectional receiver 6 is placed on the remote network 9. The unidirectional receiver 6 is connected between the other end of the unidirectional network 11 and the remote network 9. The unidirectional receiver 6 is capable of communication in a direction from the unidirectional network 11 to the remote network 9. On the other hand, the unidirectional receiver 6 is incapable of communication in a direction from the remote network 9 to the unidirectional network 11.

Figure 2B:
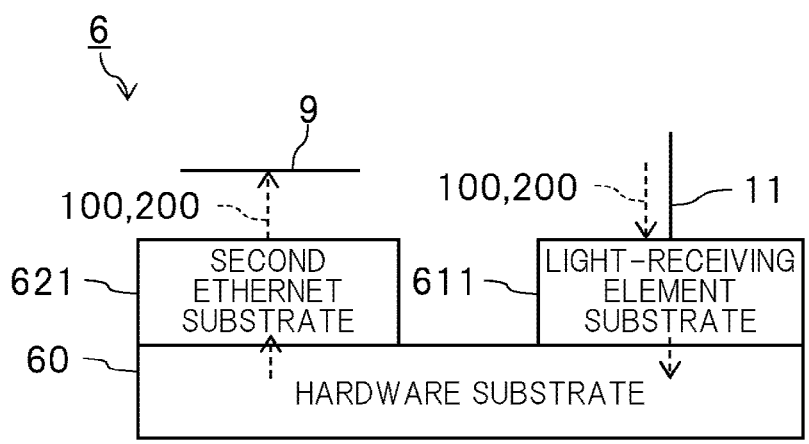
FIG. 2B is a schematic sectional view showing a receiver according to the first embodiment.

FIG. 2B is a schematic sectional view showing the unidirectional receiver 6. As shown in FIG. 2B, the unidirectional receiver 6 includes a hardware substrate 60, and a light-receiving element substrate 611 and a second Ethernet substrate 621 which are placed on the hardware substrate 60. The hardware substrate 60 is, for example, a mother board and includes a memory, a CPU, and the like (not shown). The light-receiving element substrate 611 constitutes the reception module 61. The second Ethernet substrate 621 constitutes the second Ethernet module 62.

The light-receiving element substrate 611 receives (light of) the instruction signal 100 and the process data 200 transmitted from the light-emitting element substrate 521 via the unidirectional network 11. The CPU of the hardware substrate 60 copies the instruction signal 100 and the process data 200 received by the light-receiving element substrate 611 into the memory. The second Ethernet substrate 621 transfers (transmits) the instruction signal 100 and the process data 200 copied into the memory to the monitoring terminal 7. The light-receiving element substrate 611 does not have a function to transmit data to the unidirectional network 11. Accordingly, communication in a direction from the remote network 9 to the unidirectional network 11 can be prevented.

By performing unidirectional communication from the unidirectional network 11 to the remote network 9, the unidirectional receiver 6 can transfer the instruction signal 100 and the process data 200 required for monitoring of the final control element 2 to the monitoring terminal 7 on the remote network 9. The unidirectional receiver 6 can securely prevent an intrusion from the remote network 9 to the control network 8 along with the unidirectional transmitter 5.

(Monitoring Terminal 7)

The monitoring terminal 7 is, for example, a personal computer. The monitoring terminal 7 is placed on the remote network 9. The monitoring terminal 7 receives the instruction signal 100 and the process data 200 transferred from the unidirectional receiver 6.

The monitoring terminal 7 displays a monitoring screen corresponding to the received instruction signal 100 and process data 200. This enables a user of the monitoring terminal 7 to monitor an operation state of the final control element 2.

Operation Example

Figure 3:
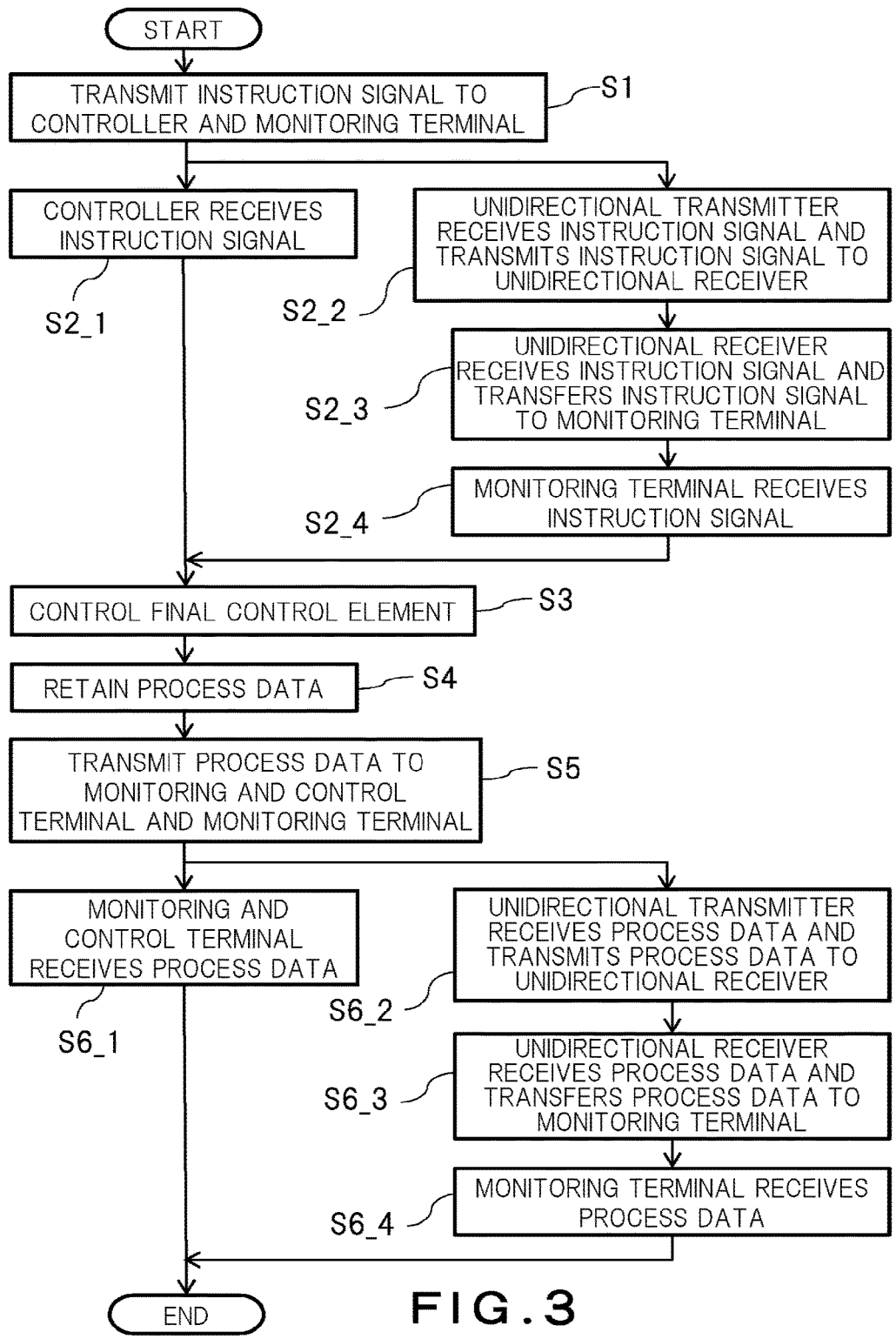
FIG. 3 is a flowchart showing an operation example of the monitoring and control system according to the first embodiment.

An operation example, that is, a monitoring and control method of the monitoring and control system 1 according to the first embodiment is explained next. FIG. 3 is a flowchart showing an operation example of the monitoring and control system according to the first embodiment.

First, the monitoring and control terminal 3 transmits the instruction signal 100 to the controller 4 on the control network 8 and the monitoring terminal 7 on the remote network 9 by the UDP multicast or the broadcast (Step S1). The monitoring and control terminal 3 transmits the instruction signal 100 in an Ethernet frame format addressed to the controller 4 and the monitoring terminal 7.

Next, the controller 4 receives the instruction signal 100 transmitted from the monitoring and control terminal 3 (Step S2_1). At that time, the unidirectional transmitter 5 receives the instruction signal 100 addressed to the monitoring terminal 7 and transmits the received instruction signal 100 to the unidirectional receiver 6 (Step S2_2). The unidirectional receiver 6 receives the instruction signal 100 transmitted from the unidirectional transmitter 5 and transfers the received instruction signal 100 to the monitoring terminal 7 (Step S2_3). The monitoring terminal 7 receives the instruction signal 100 transferred from the unidirectional receiver 6 (Step S2_4). The monitoring terminal 7 can display a monitoring screen corresponding to the received instruction signal 100.

Subsequently, the controller 4 controls the final control element 2 according to the instruction signal 100 (Step S3). For example, the controller 4 can input the instruction signal 100 as an input value to the logic of the controller 4, calculate an output value corresponding to the input value according to the logic, and output the calculated output value as an operation command to the final control element 2. An input value other than the instruction signal 100, such as operation states of other final control elements, can be input to the logic.

Next, the controller 4 retains the process data 200 in the process database 41 (Step S4). For example, the controller 4 can store therein the instruction signal 100 from the monitoring and control terminal 3, an operation command signal transmitted from the controller 4 to the final control element 2, information returned by the final control element 2 in response to the operation command signal, and the like as the process data 200.

Subsequently, the controller 4 transmits the process data 200 retained in the process database 41 to the monitoring and control terminal 3 on the control network 8 and the monitoring terminal 7 on the remote network 9 by the UDP multicast or the broadcast (Step S5). The controller 4 transmits the process data 200 in an Ethernet frame format addressed to the monitoring and control terminal 3 and the monitoring terminal 7 as destinations.

Next, the monitoring and control terminal 3 receives the process data 200 transmitted from the controller 4 (Step S6_1). The monitoring and control terminal 3 can display a monitoring screen corresponding to the received process data 200. At that time, the unidirectional transmitter 5 receives the process data 200 addressed to the monitoring terminal 7 and transmits the received process data 200 to the unidirectional receiver 6 (Step S6_2). The unidirectional receiver 6 receives the process data 200 transmitted from the unidirectional transmitter 5 and transfers the received process data 200 to the monitoring terminal 7 (Step S6_3). The monitoring terminal 7 receives the process data 200 transferred from the unidirectional receiver 6 (Step S6_4). The monitoring terminal 7 can display a monitoring screen corresponding to the received process data 200.

If the instruction signal 100 and the process data 200 are transmitted using the TCP/IP, it is necessary to transmit an ARP (Address Resolution Protocol) to transmission destinations and further receive response frames to the ARP from the transmission destinations before transmitting the instruction signal 100 and the process data 200. Due to the necessity of transmission of the ARP and responses thereto, the instruction signal 100 and the process data 200 cannot be transmitted promptly. In contrast thereto, in the first embodiment, the instruction signal 100 and the process data 200 are transmitted by the UDP multicast or the broadcast, which enables the instruction signal 100 and the process data 200 to be transmitted promptly without requiring transmission of an ARP and responses thereto.

Furthermore, in the first embodiment, unidirectional communication from the control network 8 to the remote network 9 is performed and accordingly an intrusion from the remote network 9 to the control network 8 can be prevented.

Therefore, according to the first embodiment, safety in control of a target device on a network and promptness of monitoring can both be provided.

When a plurality of the monitoring and control terminals 3 are connected to the control network 8, even if one of the monitoring and control terminals 3 fails, another monitoring and control terminal 3 can take over the control of the final control element 2. The monitoring and control terminal 3 that takes over the control of the final control element 2 has acquired the instruction signal 100 and the process data 200 by the UDP multicast or the broadcast before taking over the control and thus has known a detailed operation condition of the final control element 2. Therefore, the control of the final control element 2 can be taken over smoothly and reliably.

When a plurality of the monitoring terminals 7 are connected to the remote network 9, even if one of the monitoring terminals 7 fails, another monitoring terminal 7 can take over the monitoring of the final control element 2.

Second Embodiment

The monitoring and control system 1 that moves the monitoring and control terminal 3 from a position on the control network 8 to a position on the remote network 9 is explained next as a second embodiment. In the second embodiment, constituent parts corresponding to those in the embodiment described above are denoted by like reference characters and redundant explanations thereof will be omitted.

Figure 4A:
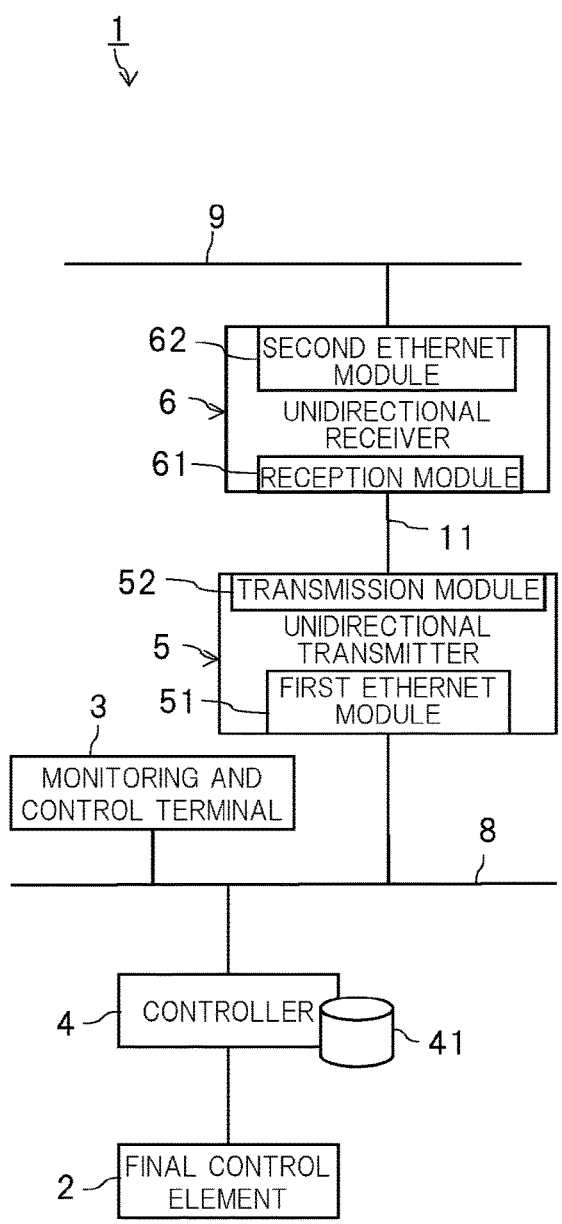
FIG. 4A is a block diagram showing a monitoring and control system before movement of a monitoring and control terminal in a second embodiment.
Figure 4B:
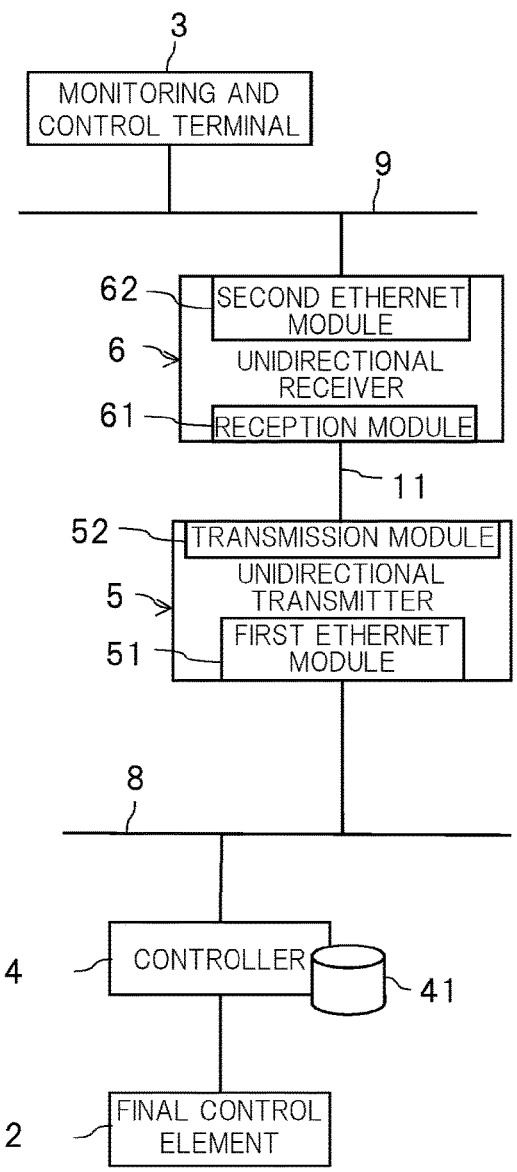
FIG. 4B is a block diagram showing the monitoring and control system after the movement of the monitoring and control terminal.

FIG. 4A is a block diagram showing the monitoring and control system 1 before movement of the monitoring and control terminal 3 in the second embodiment. FIG. 4B is a block diagram showing the monitoring and control system 1 after the movement of the monitoring and control terminal 3. In FIGS. 4A and 4B, illustration of the monitoring terminal 7 is omitted.

As described above, in the monitoring and control system 1, the same information 100 and 200 can be acquired both on the control network 8 and on the remote network 9 by the UDP multicast or the broadcast. Therefore, a device placed on the control network 8 and a device placed on the remote network 9 can be regarded to belong to a same network segment. The UDP multicast or the broadcast does not require responses from transmission destinations unlike the TCP/IP.

Accordingly, the monitoring and control terminal 3 can move, that is, change a placement position from the control network 8 to the remote network 9 as shown in FIGS. 4A and 4B while keeping setting (initial setting by setup, for example) on the control network 8. The setting of the monitoring and control terminal 3 can include setting of an IP address and setting of a monitoring screen. The monitoring and control terminal 3 moved onto the remote network 9 can receive on the remote network 9, information transmitted from a transmission source on the control network 8 by the UDP multicast or the broadcast. The transmission source on the control network 8 is, for example, another monitoring and control terminal having taken over control of the final control element 2 from the monitoring and control terminal 3, or the controller 4.

According to the second embodiment, the monitoring and control terminal 3 can be moved to the remote network 9 while the setting on the control network 8 is kept. Therefore, transition from monitoring on the control network 8 to monitoring on the remote network 9 using unidirectional communication can be easily achieved.

Furthermore, also in a case where bidirectional communication with the controller 4 is required for setup of the monitoring and control terminal 3, the setup can be reliably performed by initially connecting the monitoring and control terminal 3 to the control network 8.

Third Embodiment

The monitoring and control system 1 that retains a history of information transmitted from a transmission source on the control network 8, on the remote network 9 is explained next as a third embodiment. In the third embodiment, constituent parts corresponding to those in the embodiments described above are denoted by like reference characters and redundant explanations thereof will be omitted.

Figure 5:
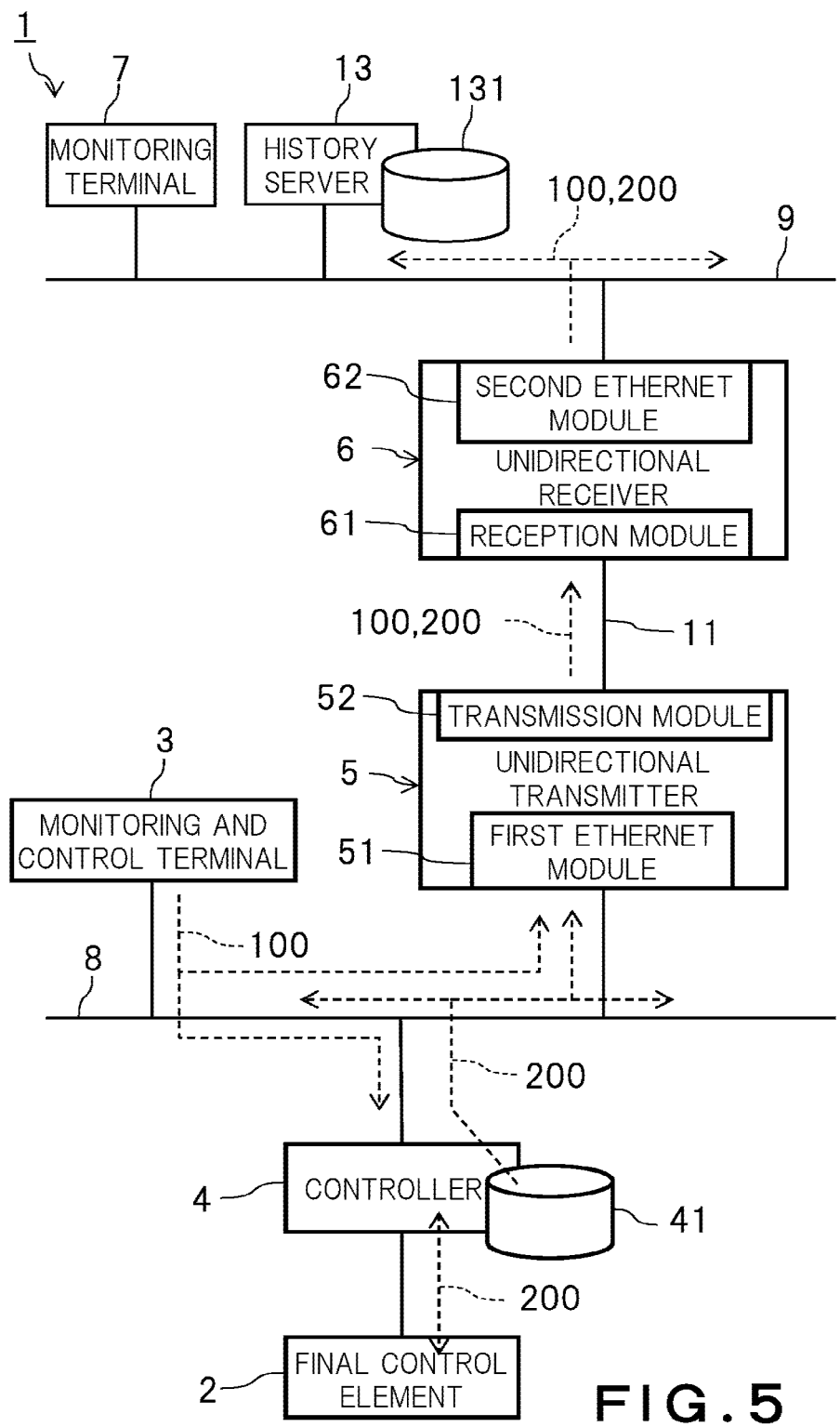
FIG. 5 is a block diagram showing a monitoring and control system according to a third embodiment.

FIG. 5 is a block diagram showing the monitoring and control system 1 according to the third embodiment. As shown in FIG. 5, the monitoring and control system 1 according to the third embodiment includes a history server 13 as an example of a server placed on, that is, connected to the remote network 9. The history server 13 includes a history database 131.

The history server 13 is one of transmission destinations on the remote network 9. The history server 13 retains information transmitted from a transmission source on the control network 8 as a history. Specifically, each time a latest instruction signal 100 from the monitoring and control terminal 3 as a transmission source is received, the history server 13 accumulates therein the received instruction signal 100 in the history database 131. Furthermore, each time latest process data 200 from the controller 4 as a transmission source is received, the history server 13 accumulates therein the received process data 200 in the history database 131.

The monitoring terminal 7 is capable of reading the histories of the instruction signal 100 and the process data 200 retained in the history database 131.

Because unidirectional communication from the control network 8 to the remote network 9 is allowed, the monitoring terminal 7 on the remote network 9 cannot request monitoring target information 100 and 200 to a device on the control network 8. In contrast thereto, according to the third embodiment, the history server 13 is provided on the remote network 9 and thus the monitoring terminal 7 can acquire the histories of the monitoring target information 100 and 200 of past and current times on the remote network 9. The present embodiment can also be applied in order for a plurality of monitoring terminals on the remote network 9 to acquire the histories of the monitoring target information 100 and 200.

Fourth Embodiment

The monitoring and control system 1 that transmits logic information is explained next as a fourth embodiment. In the fourth embodiment, constituent parts corresponding to those in the embodiments described above are denoted by like reference characters and redundant explanations thereof will be omitted.

Figure 6:
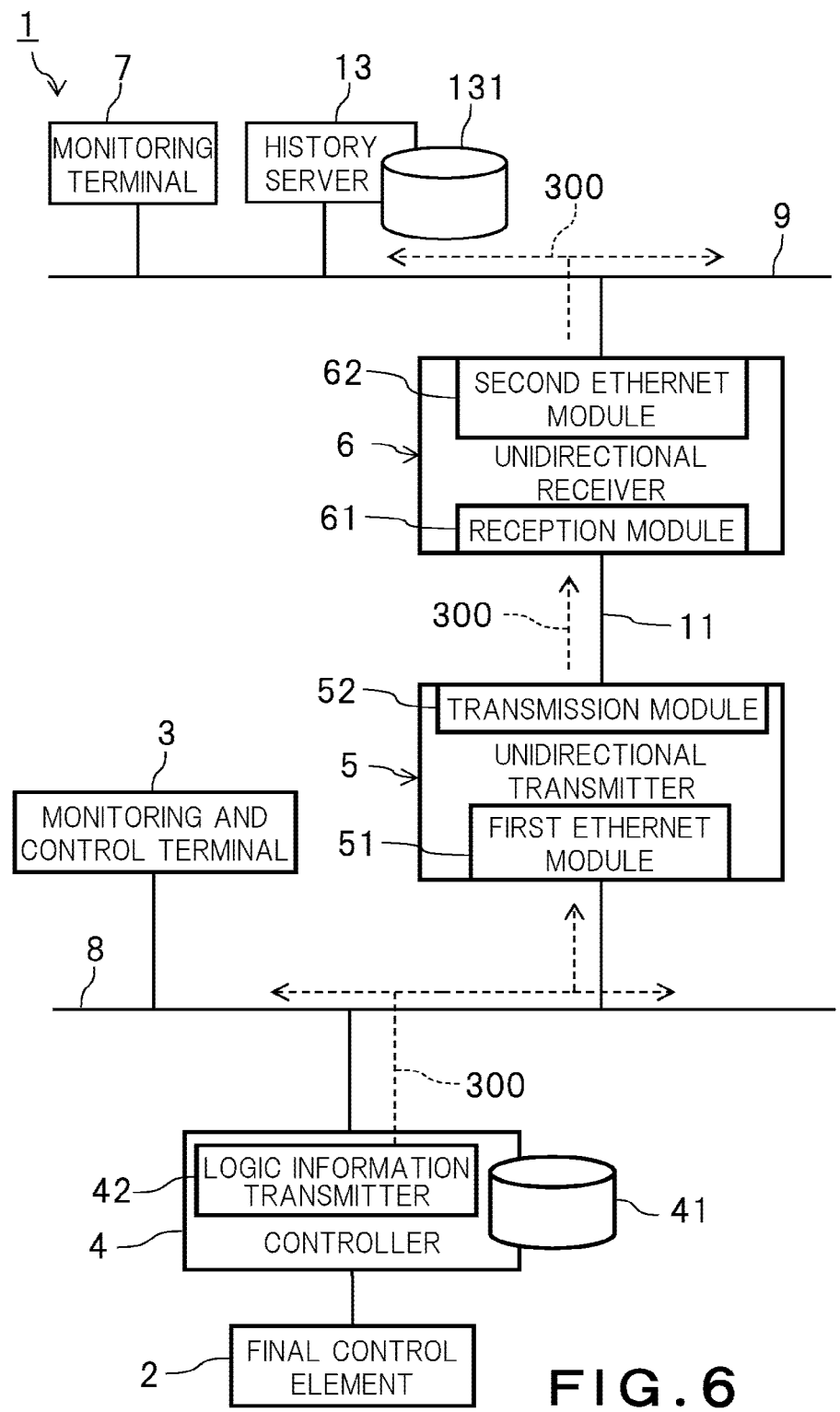
FIG. 6 is a block diagram showing a monitoring and control system according to a fourth embodiment.

FIG. 6 is a block diagram showing the monitoring and control system 1 according to the fourth embodiment. As shown in FIG. 6, the monitoring and control system 1 according to the fourth embodiment includes a logic information transmitter 42 in addition to the configuration of the third embodiment. The logic information transmitter 42 is provided in the controller 4. The logic information transmitter 42 transmits logic information 300 to transmission destinations on the remote network 9 periodically by the UDP multicast or the broadcast. The logic information 300 is information indicating a state of control logic of the controller 4. For example, the logic information 300 can be information indicating an input value and an output value of the control logic, or information indicating all values related to the control logic including a mid-calculation result obtained in a process of a calculation of an output value. The logic information transmitter 42 can transmit the logic information 300 each time the control logic has progressed a predetermined number of steps (one step, for example). In the configuration shown in FIG. 6, the transmission destinations of the logic information 300 are the monitoring and control terminal 3, the monitoring terminal 7, and the history server 13.

The history server 13 retains the logic information 300 transmitted from the logic information transmitter 42 as a history in the history database 131.

Operation Example

Figure 7:
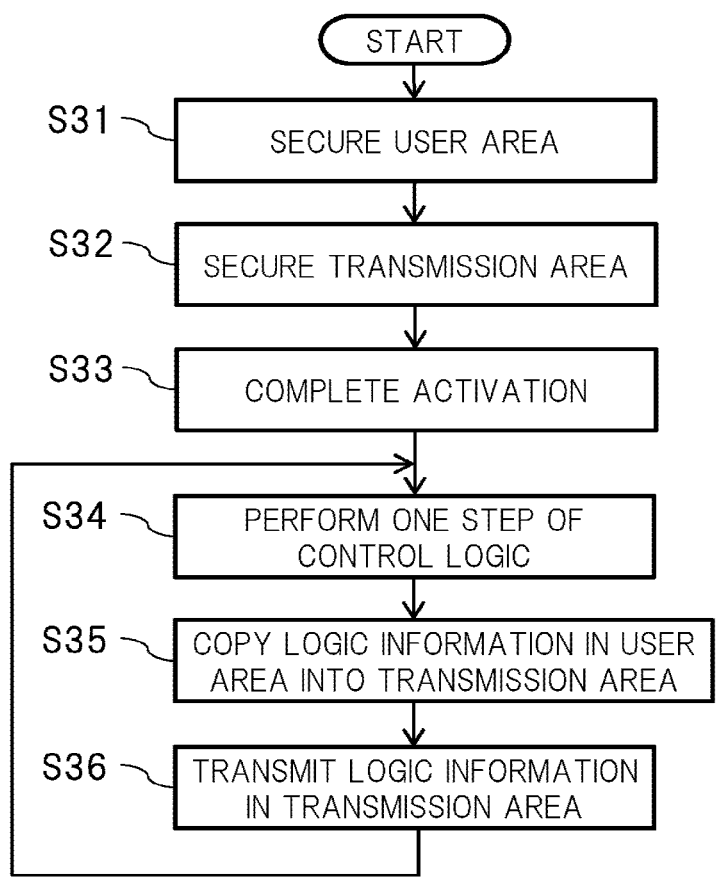
FIG. 7 is a flowchart showing an operation example of a controller in the monitoring and control system according to the fourth embodiment.

FIG. 7 is a flowchart showing an operation example of the controller 4 in the monitoring and control system 1 according to the fourth embodiment. FIG. 7 is also a specific example of control of the final control element (Step S3) in FIG. 3.

First, the controller 4 secures a user area on a main memory in the controller 4 with the instruction signal 100 (Step S2_1 in FIG. 3) as a trigger (Step S31). The user area is a region in which an input value and an output value of the control logic, a mid-calculation result, and the like are retained for execution of the control logic.

Next, the controller 4 secures a transmission area on the main memory (Step S32). The transmission area is a region in which the logic information 300 is retained for transmission of the logic information 300.

When the user area and the transmission area are secured, activation of the controller 4 is completed (Step S33).

After completion of the activation (Step S33), the controller 4 performs one step of the control logic (Step S34).

Figure 8:
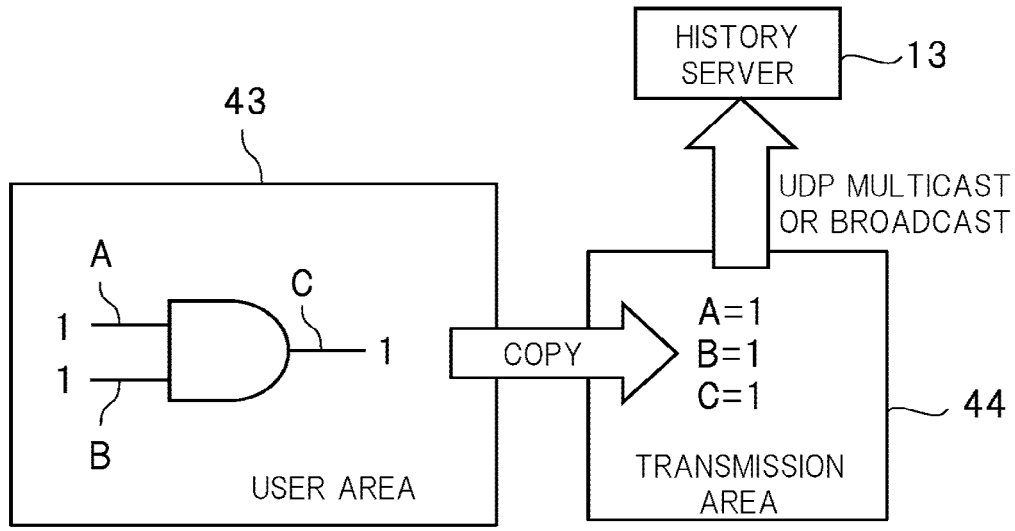
FIG. 8 is a schematic diagram showing an operation example of the controller in the monitoring and control system according to the fourth embodiment.

FIG. 8 is a schematic diagram showing an operation example of the controller 4 in the monitoring and control system 1 according to the fourth embodiment. In FIG. 8, an AND gate on a user area 43 is shown as a simple example of the control logic of the controller 4. However, the logic of the controller 4 is not limited to the AND gate and can be more complicated than the AND gate.

The AND gate shown in FIG. 8 receives the instruction signal 100 for valve opening transmitted from the monitoring and control terminal 3 to the valve switching device as an input A. The AND gate also receives a signal indicating whether to perform valve opening in view of operation states of final control elements (which can be other valve switching devices) other than the valve switching device as an input B. The input B can be a value calculated using logic of a higher order than the AND gate in FIG. 8. The AND gate outputs an operation command for the valve switching device, which is a logical conjunction of the input A and the input B, as an output C.

When the instruction signal 100 for valve opening is input to the valve switching device (A=1) and the valve opening is right (B=1), an operation command for valve opening is output to the valve switching device (C=1). On the other hand, when the valve opening is not right (B=0) even when the instruction signal 100 for valve opening is input to the valve switching device (A=1), the operation command for valve opening is not output to the valve switching device (C=0).

The controller 4 retains the input A, the input B, and the output C shown in FIG. 8, for example, in the user area 43, to execute the control logic while generating the logic information 300. The controller 4 can perform retention of the input A, retention of the input B, calculation and retention of the output C as one step of the control logic.

After one step of the control logic is performed (Step S34), the logic information transmitter 42 copies the logic information 300 in the user area 43 into a transmission area 44 (see FIG. 8) (Step S35 in FIG. 7).

Next, the logic information transmitter 42 transmits the logic information 300 in the transmission area 44 to the history server 13 as one of transmission destinations by the UDP multicast or the broadcast (Step S36). A series of processes from performing one step of the control logic (Step S34) to transmitting the logic information 300 (Step S36) is repeated each time the input value to the control logic changes. If the logic information 300 in the user area 43 is transmitted directly to the history server 13, another execution of the control logic corresponding to a change of the input value may be delayed because contents of the user area 43 cannot be rewritten until transmission of the logic information 300 is completed. In contrast thereto, in the fourth embodiment, the logic information 300 copied into the transmission area 44 that does not affect the user area 43 is transmitted to enable another execution of the control logic in the user area 43 promptly.

According to the fourth embodiment, the logic information 300 can be retained in the history server 13. Therefore, even when the monitoring terminal 7 on the remote network 9 cannot request the logic information 300 to the controller 4 due to the unidirectional communication, the monitoring terminal 7 can read the logic information 300 from the history server 13. Accordingly, convenience of monitoring can be improved. Furthermore, because the logic information 300 is transmitted periodically with respect to one step, the logic information 300 can be transmitted more reliably than in a case where a large amount of the logic information 300 is transmitted in a lump. However, the number of steps corresponding to the logic information 300 can be changed appropriately according to a transmission amount that can be achieved by the monitoring and control system 1 and a retention capacity of the history server 13. The logic information 300 corresponding to plural steps can be transmitted.

Fifth Embodiment

The monitoring and control system 1 that shares the unidirectional network 11 among different network segments is explained next as a fifth embodiment. In the fifth embodiment, constituent parts corresponding to those in the embodiments described above are denoted by like reference characters and redundant explanations thereof will be omitted.

Figure 9:
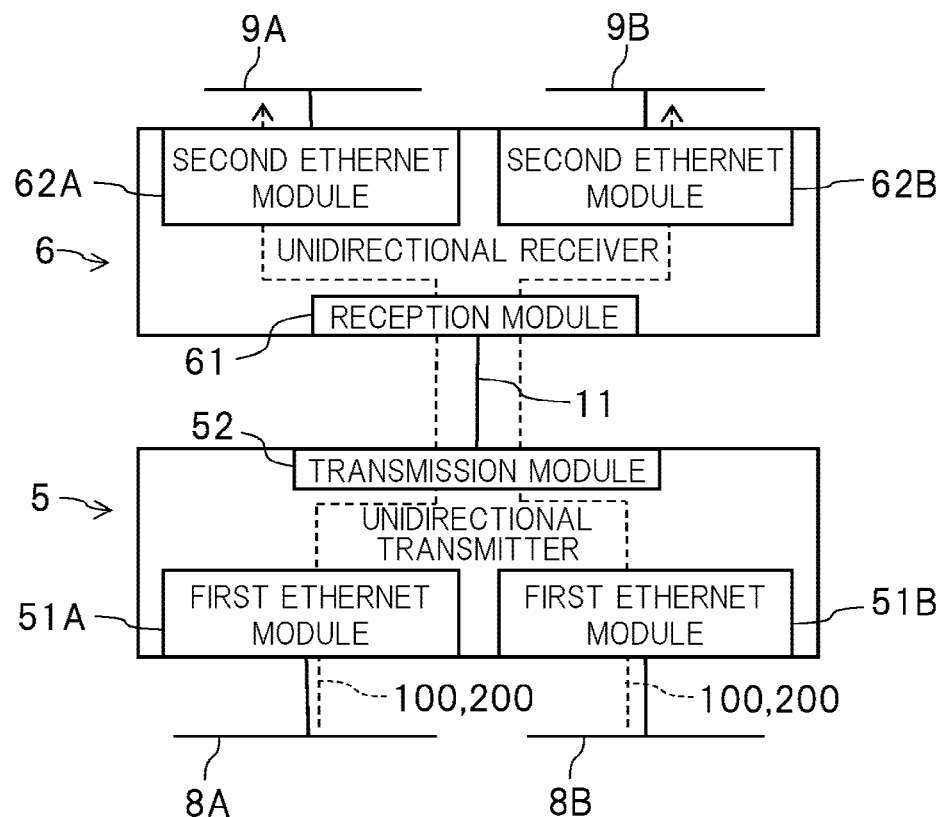
FIG. 9 is a block diagram showing a monitoring and control system according to a fifth embodiment.

FIG. 9 is a block diagram showing the monitoring and control system 1 according to the fifth embodiment. As shown in FIG. 9, the monitoring and control system 1 according to the fifth embodiment includes two control networks 8A and 8B independent of each other, and two remote networks 9A and 9B corresponding to the control networks 8A and 8B, respectively. The control network 8A and the remote network 9A corresponding thereto belong to a same network segment (hereinafter, also "first segment"). The control network 8B and the remote network 9B corresponding thereto belong to a same network segment (hereinafter, also "second segment"). Although not shown, the monitoring and control terminal 3 and the controller 4 are connected to the control network 8 in each of the segments. Furthermore, the monitoring terminal 7 is connected to the remote network 9 in each of the segments. The monitoring and control system 1 can include three or more network segments.

(Unidirectional Transmitter 5)

As shown in FIG. 9, the unidirectional transmitter 5 is placed on the control network 8A of the first segment and the control network 8B of the second segment. The unidirectional transmitter 5 includes a first Ethernet module 51A of the first segment and a first Ethernet module 51B of the second segment. The transmission module 52 is shared by the first and second segments.

Figure 10A:
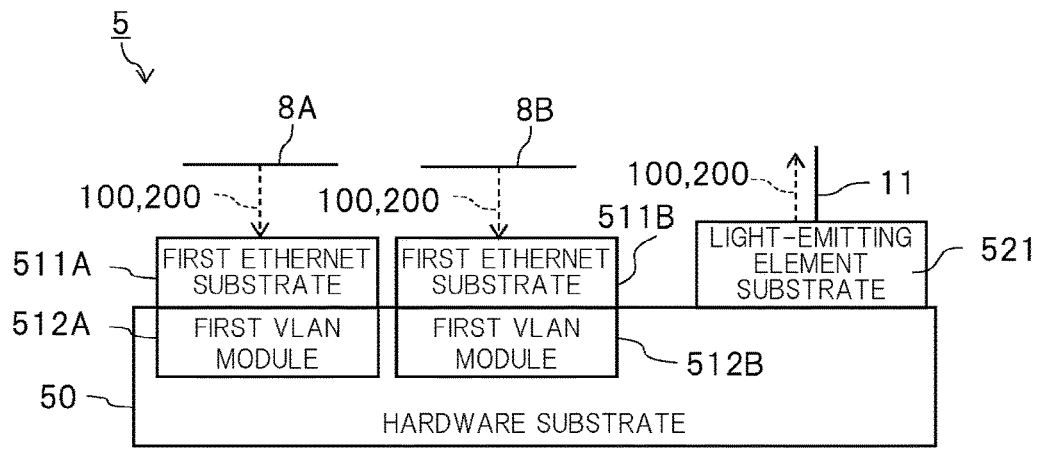
FIG. 10A is a schematic sectional view showing a transmitter in the monitoring and control system according to the fifth embodiment.

FIG. 10A is a schematic sectional view showing the unidirectional transmitter 5 in the monitoring and control system 1 according to the fifth embodiment. As shown in FIG. 10A, the unidirectional transmitter 5 includes a first Ethernet substrate 511A and a first VLAN (Virtual LAN) module 512A of the first segment, and a first Ethernet substrate 511B and a first VLAN module 512B of the second segment. The first Ethernet substrate 511A and the first VLAN module 512A of the first segment constitute the first Ethernet module 51A of the first segment. The first Ethernet substrate 511B and the first VLAN module 512B of the second segment constitute the first Ethernet module 51B of the second segment.

The first Ethernet substrate 511A of the first segment receives the instruction signal 100 from the monitoring and control terminal 3 of the first segment to be addressed to the monitoring terminal 7 of the first segment, and the process data 200 from the controller 4 of the first segment to be addressed to the monitoring terminal 7 of the first segment. The first Ethernet substrate 511B of the second segment receives the instruction signal 100 from the monitoring and control terminal 3 of the second segment to be addressed to the monitoring terminal 7 of the second segment, and the process data 200 from the controller 4 of the second segment to be addressed to the monitoring terminal 7 of the second segment.

The first VLAN module 512A of the first segment attaches VLAN information of the first segment to the instruction signal 100 and the process data 200 addressed to the monitoring terminal 7 of the first segment. The first VLAN module 512B of the second segment attaches VLAN information of the second segment to the instruction signal 100 and the process data 200 addressed to the monitoring terminal 7 of the second segment. The VLAN information is not particularly limited to a specific mode as long as it is information that enables the first segment and the second segment to be distinguished from each other.

The CPU of the hardware substrate 50 copies the instruction signals 100 and the process data 200 received by the first Ethernet substrates 511A and 511B of the respective segments into the memory. The light-emitting element substrate 521 transmits the instruction signals 100 and the process data 200 in the memory to the unidirectional network 11. The unidirectional network 11 is shared by the first and second segments. Therefore, the unidirectional transmitter 5 can transmit the instruction signals 100 and the process data 200 from transmission sources on the control networks 8 of the respective segments via the common unidirectional network 11.

(Unidirectional Receiver 6)

As shown in FIG. 9, the unidirectional receiver 6 is placed on the remote network 9A of the first segment and the remote network 9B of the second segment. The unidirectional receiver 6 includes a second Ethernet module 62A of the first segment and a second Ethernet module 62B of the second segment. The reception module 61 is shared by the first and second segments.

Figure 10B:
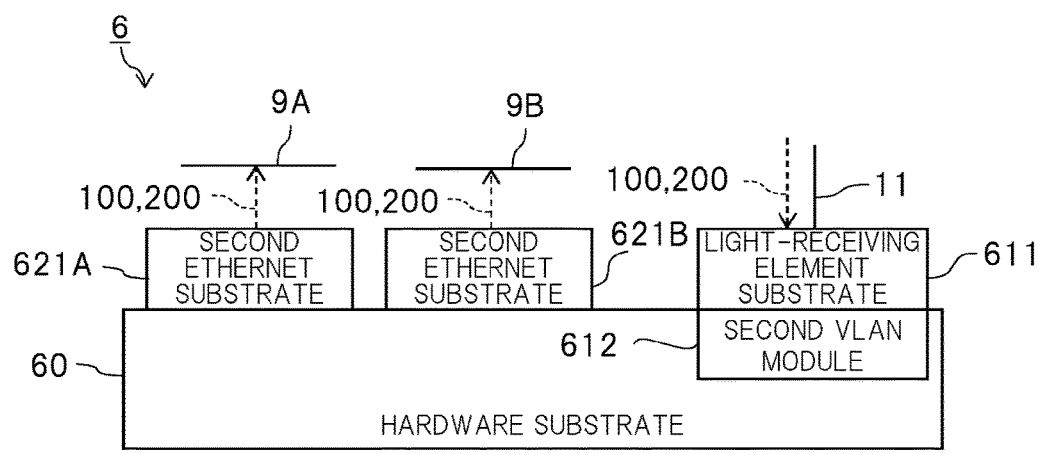
FIG. 10B is a schematic sectional view showing a receiver according to the fifth embodiment.

FIG. 10B is a schematic sectional view showing the unidirectional receiver 6 in the monitoring and control system 1 according to the fifth embodiment. As shown in FIG. 10B, the reception module 61 includes a light-receiving element substrate 611 and a second VLAN module 612. The unidirectional receiver 6 includes a second Ethernet substrate 621A of the first segment and a second Ethernet substrate 621B of the second segment as shown in FIG. 10B.

The second VLAN module 612 transfers the instruction signal 100 and the process data 200 received by the light-receiving element substrate 611 via the second Ethernet substrates 621A and 621B. To transfer the instruction signal 100 and the process data 200, the second VLAN module 612 selects either the second Ethernet substrate 621A or 621B to be used for transfer based on the VLAN information attached to the instruction signal 100 and the process data 200. Therefore, the unidirectional receiver 6 can transfer the monitoring target information 100 and 200 being from transmission sources on the respective control networks 8A and 8B and transmitted by the unidirectional transmitter 5 to transmission destinations of the corresponding remote networks 9A and 9B, respectively.

Operation Example

Figure 11:
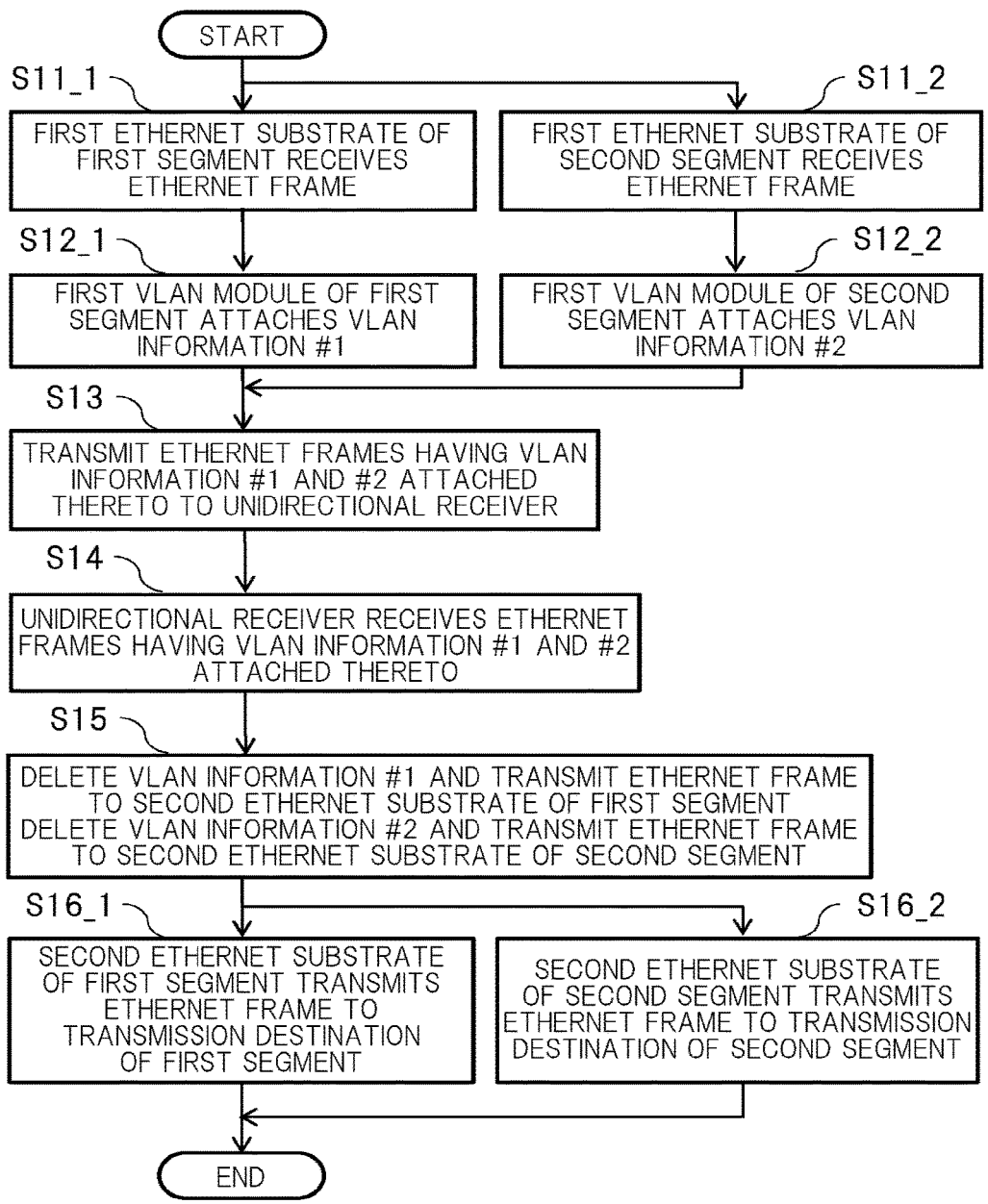
FIG. 11 is a flowchart showing an operation example of the transmitter and the receiver in the monitoring and control system according to the fifth embodiment.

FIG. 11 is a flowchart showing an operation example of the unidirectional transmitter 5 and the unidirectional receiver 6 in the monitoring and control system 1 according to the fifth embodiment. In the operation example described below, the instruction signal 100 and the process data 200 are collectively referred to as "Ethernet data".

First, the first Ethernet substrate 511A of the first segment in the unidirectional transmitter 5 receives an Ethernet frame addressed to a transmission destination on the remote network 9A of the first segment from a transmission source on the control network 8A of the first segment (Step S11_1). Meanwhile, the first Ethernet substrate 511B of the second segment in the unidirectional transmitter 5 receives an Ethernet frame addressed to a transmission destination on the remote network 9B of the second segment from a transmission source on the control network 8B of the second segment (Step S11_2).

FIG. 12A is a schematic diagram showing an Ethernet frame 400 before attachment of VLAN information in the operation example of the unidirectional transmitter 5 in the monitoring and control system 1 according to the fifth embodiment. As shown in FIG. 12A, the Ethernet frame 400 has Ethernet data, and a transmission destination address and a transmission source address attached as a header to the Ethernet data. The transmission destination address is a multicast address or a broadcast address corresponding to each segment.

FIG. 13A shows a correspondence relation between the first VLAN modules 512A and 512B of the unidirectional transmitter 5 and VLAN information to be attached by the first VLAN modules 512A and 512B, respectively, in the operation example of the unidirectional transmitter 5 in the monitoring and control system 1 according to the fifth embodiment. FIG. 12B is a schematic diagram showing the Ethernet frame 400 after attachment of VLAN information of the first segment. After reception of the Ethernet frame 400 addressed to the transmission destination of the first segment (Step S11_1 in FIG. 11), the first VLAN module 512A of the first segment attaches VLAN information #1 of the first segment to the Ethernet frame 400 as shown in FIG. 12B according to the correspondence relation shown in FIG. 13A (Step S12_1 in FIG. 11).

FIG. 12C is a schematic diagram showing the Ethernet frame 400 after attachment of VLAN information of the second segment. After reception of the Ethernet frame 400 addressed to the transmission destination of the second segment (Step S11_2 in FIG. 11), the first VLAN module 512B of the second segment attaches VLAN information #2 of the second segment to the Ethernet frame 400 as shown in FIG. 12C according to the correspondence relation shown in FIG. 13A (Step S12_2 in FIG. 11).

Next, the transmission module 52 transmits the Ethernet frame 400 having the VLAN information #1 of the first segment attached thereto and the Ethernet frame 400 having the VLAN information #2 of the second segment attached thereto to the unidirectional receiver 6 via the unidirectional network 11 shared by the first and second segments (Step S13).

Subsequently, the light-receiving element substrate 611 of the reception module 61 receives the Ethernet frame 400 having the VLAN information #1 of the first segment attached thereto and the Ethernet frame 400 having the VLAN information #2 of the second segment attached thereto from the unidirectional transmitter 5 (Step S14).

FIG. 13B shows a correspondence relation between the VLAN information and the second Ethernet substrates 621A and 621B of the unidirectional receiver 6 linked to the VLAN information in the operation example of the unidirectional receiver 6. Next, the second VLAN module 612 of the unidirectional receiver 6 transmits the Ethernet frame 400 having the VLAN information #1 of the first segment attached thereto to the second Ethernet substrate 621A of the first segment according to the correspondence relation shown in FIG. 13B (Step S15 in FIG. 11). At that time, the second VLAN module 612 deletes the VLAN information #1 from the Ethernet frame 400. The second VLAN module 612 also transmits the Ethernet frame 400 having the VLAN information #2 of the second segment attached thereto to the second Ethernet substrate 621B of the second segment (Step S15). At that time, the second VLAN module 612 deletes the VLAN information #2 from the Ethernet frame 400.

Subsequently, the second Ethernet substrate 621A of the first segment transmits the Ethernet frame 400 to a transmission destination on the remote network 9 of the first segment (Step S16_1). The second Ethernet substrate 621B of the second segment transmits the Ethernet frame 400 to a transmission destination on the remote network 9 of the second segment (Step S16_2).

According to the fifth embodiment, communication of different segments can be performed using the common unidirectional network 11. Accordingly, the number of parts and the cost can be reduced.

Sixth Embodiment

The monitoring and control system 1 having a plurality of the unidirectional networks 11 is explained next as a sixth embodiment. In the sixth embodiment, constituent parts corresponding to those in the embodiments described above are denoted by like reference characters and redundant explanations thereof will be omitted.

Figure 14:
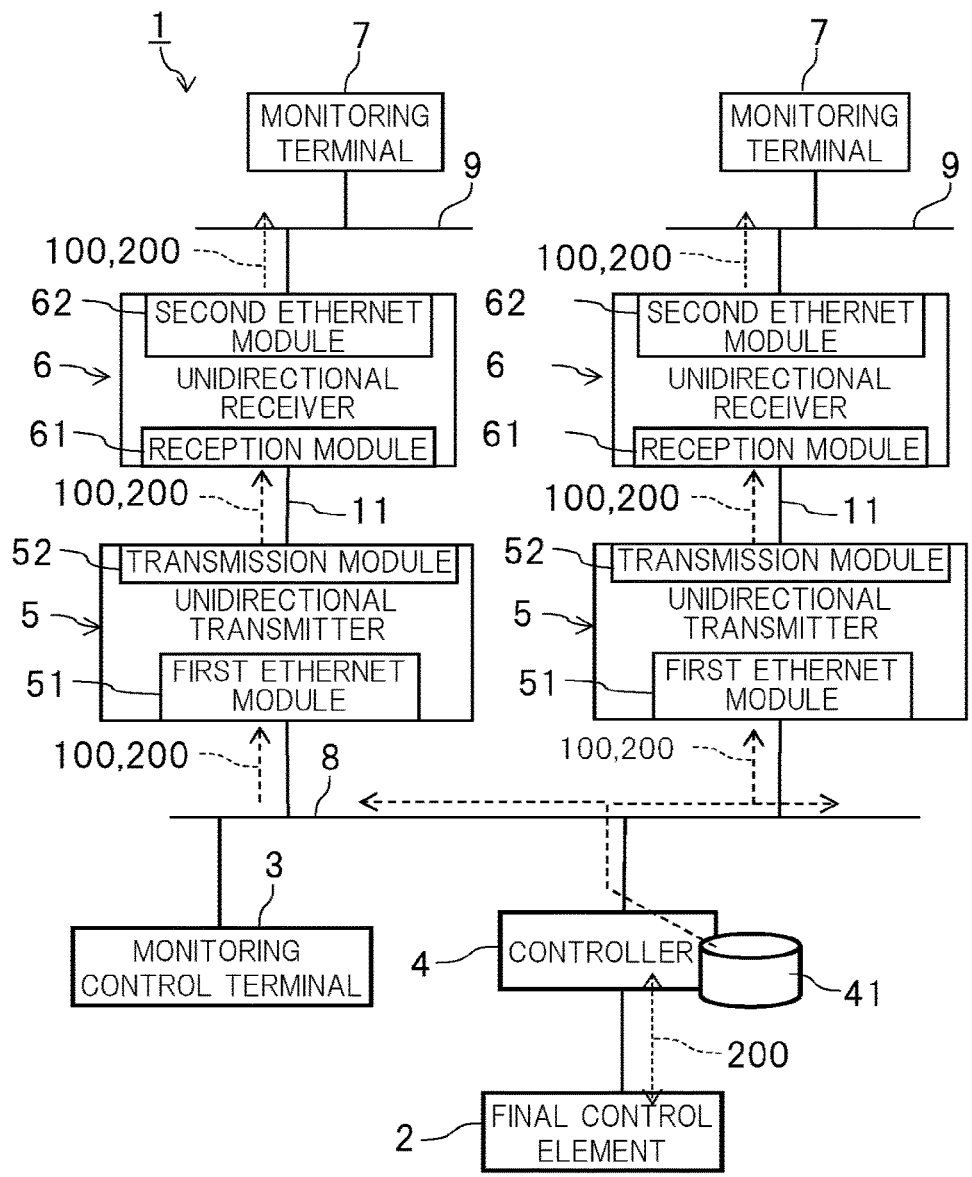
FIG. 14 is a block diagram showing a monitoring and control system according to a sixth embodiment.

FIG. 14 is a block diagram showing the monitoring and control system 1 according to the sixth embodiment. The monitoring and control system 1 according to the fifth embodiment performs communication of two segments using the common unidirectional network 11. In contrast thereto, the monitoring and control system 1 according to the sixth embodiment performs communication of a common segment using the unidirectional networks 11.

Specifically, as shown in FIG. 14, the monitoring and control system 1 according to the sixth embodiment includes two unidirectional transmitters 5 placed on the control network 8. The monitoring and control system 1 according to the sixth embodiment also includes two unidirectional networks 11, two unidirectional receivers 6, two remote networks 9, and two monitoring terminals 7 to correspond to the two unidirectional transmitters 5, respectively.

Because the two unidirectional networks 11 ensure unidirectional communication, communication between the two remote networks 9 connected to the unidirectional networks 11, respectively, is impossible. Therefore, the two remote networks 9 are independent of each other while belonging to a same network segment. Three or more unidirectional networks 11 can be provided, and three or more unidirectional transmitters 5, three or more unidirectional receivers 6, and three or more remote networks 9 can be provided correspondingly.

If a same network segment is located at plural positions, the positions of respective IP addresses need to be registered and managed to prevent duplication of the IP addresses in order to avoid a system error. In contrast thereto, in the sixth embodiment, the two remote networks 9 are independent of each other while belonging to a same network segment. Accordingly, even when IP addresses of terminals on the two remote networks 9 are the same, unidirectional communication to the respective terminals can be appropriately performed. Therefore, the sixth embodiment can reduce management cost of the IP addresses.

Seventh Embodiment

The monitoring and control system 1 that changes information related to the control network 8 is explained next as a seventh embodiment. In the seventh embodiment, constituent parts corresponding to those in the embodiments described above are denoted by like reference characters and redundant explanations thereof will be omitted.

Figure 15:
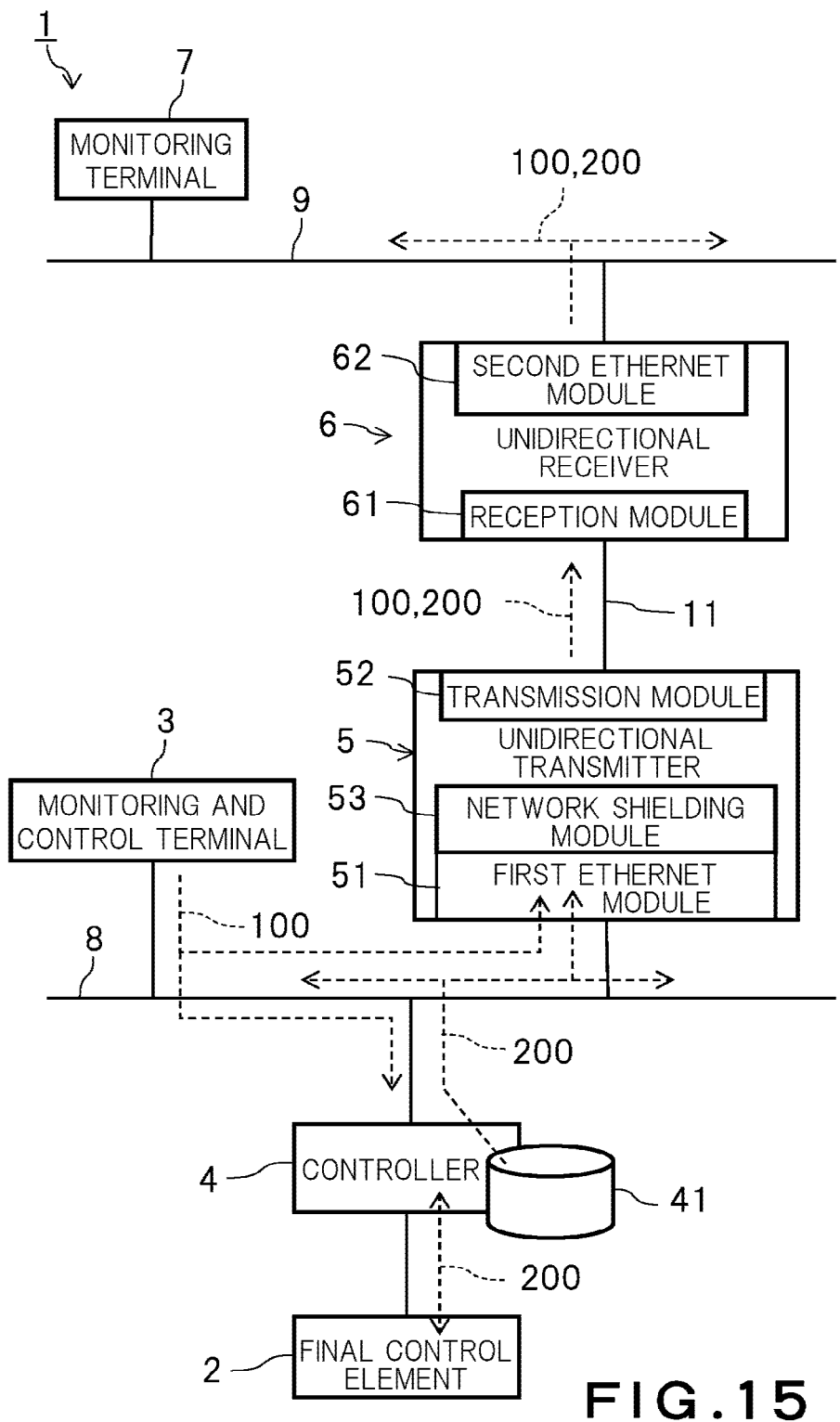
FIG. 15 is a block diagram showing a monitoring and control system according to a seventh embodiment.

FIG. 15 is a block diagram showing the monitoring and control system 1 according to the seventh embodiment. As shown in FIG. 15, the unidirectional transmitter 5 in the seventh embodiment includes a network shielding module 53 as an example of a changer.

The network shielding module 53 changes information related to the control network 8 and added to Ethernet data. For example, the network shielding module 53 can rewrite a transmission-source IP address and a transmission-destination IP address in the Ethernet frame 400 with arbitrary IP address values. The transmission module 52 transmits the Ethernet frame 400 having the information changed by the network shielding module 53.

According to the seventh embodiment, information related to the control network 8 can be shielded to prevent the IP addresses of the control network 8 from being obtained even when the Ethernet frame 400 transmitted to the remote network 9 is analyzed. As a result, an intrusion from the remote network 9 to the control network 8 can be prevented more effectively.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A monitoring and control system comprising:
   a monitoring and control apparatus located on a first network and transmitting an instruction signal for instructing to control a target device to transmission destinations on the first network and a second network by a transmission method designating a plurality of transmission destinations and not requiring responses from the transmission destinations;
   a controller being one of the transmission destinations on the first network, controlling the target device according to the instruction signal, and transmitting process data indicating a process of the control to transmission destinations on the first and second networks by the transmission method;
   a transmitter located on the first network, being capable of communication in a direction from the first network to a third network connecting the first network and the second network to each other, and transmitting the instruction signal from the monitoring and control apparatus and the process data from the controller to transmission destinations on the second network;
   a receiver located on the second network, being capable of communication in a direction from the third network to the second network, and receiving and transferring the instruction signal and the process data addressed to the transmission destinations on the second network and transmitted from the transmitter; and
   a monitor being one of the transmission destinations on the second network and receiving the instruction signal and the process data transferred from the receiver.

2. The system of claim 1, wherein the monitoring and control apparatus can be located on the second network while keeping setting on the first network and is capable of receiving information transmitted from a transmission source on the first network by the transmission method on the second network.

3. The system of claim 1, wherein
   the transmission destinations on the second network include a server retaining therein information transmitted from a transmission source on the first network as a history, and
   the monitor is capable of reading the history retained in the server.

4. The system of claim 1, wherein the controller comprises a logic information transmitter transmitting logic information indicating a state of control logic of the controller to the transmission destinations on the second network periodically by the transmission method.

5. The system of claim 1, wherein
the transmitter is located on a plurality of first networks and transmits information from transmission sources on the first networks, respectively, via a common third network, and
the receiver is located on a plurality of second networks corresponding to the first networks, respectively, and transfers information being from the transmission sources on the first networks and transmitted by the transmitter, to transmission destinations on the corresponding second networks, respectively.

6. The system of claim 1, wherein
a plurality of the transmitters are located on the first network, and
a plurality of the third networks, a plurality of the receivers, a plurality of the second networks, and a plurality of the monitors are located to correspond to the transmitters, respectively.

7. The system of claim 1, wherein the transmitter comprises a changer changing information added to the instruction signal or the process data and related to the first network.

8. The system of claim 1, wherein
the transmitter comprises a first Ethernet substrate connected to the first network, and a light-emitting element substrate connected to one of ends of the third network, and
the receiver comprises a light-receiving element substrate connected to other end of the third network, and a second Ethernet substrate connected to the second network.

9. A monitoring and control method comprising:
transmitting, using a monitoring and control apparatus located on a first network, an instruction signal for instructing to control a target device to transmission destinations on the first network and a second network by a transmission method designating a plurality of transmission destinations and not requiring responses from the transmission destinations;
controlling the target device according to the instruction signal and transmitting process data indicating a process of the control to transmission destinations on the first and second networks by the transmission method, using a controller being one of the transmission destinations on the first network;
transmitting the instruction signal from the monitoring and control apparatus and the process data from the controller to transmission destinations on the second network using a transmitter located on the first network and capable of communication in a direction from the first network to a third network connecting the first network and the second network to each other;
receiving and transferring the instruction signal and the process data addressed to the transmission destinations on the second network and transmitted from the transmitter using a receiver located on the second network and being capable of communication in a direction from the third network to the second network; and
receiving the instruction signal and the process data transferred from the receiver using a monitor being one of the transmission destinations on the second network.

10. The method of claim 9, comprising locating the monitoring and control apparatus on the second network while keeping setting on the first network, and receiving information transmitted from a transmission source on the first network by the transmission method using the monitoring and control apparatus on the second network.

* * * * *